United States Patent [19]

Coombs

[11] Patent Number: 4,800,938
[45] Date of Patent: Jan. 31, 1989

[54] METHOD AND APPARATUS FOR FINGER JOINTING LUMBER

[76] Inventor: Malcolm M. Coombs, 4345 25th Ave., N.E., No. 156, Salem, Oreg. 97303

[21] Appl. No.: 119,721

[22] Filed: Nov. 10, 1987

[51] Int. Cl.$^4$ ............................ B27B 1/00; B27F 1/00
[52] U.S. Cl. .................................... 144/356; 83/360; 83/367; 144/91; 144/363; 144/347; 198/395
[58] Field of Search ................. 144/2 R, 90 R, 90 A, 144/91, 347, 356, 357, 363; 83/360, 367; 198/394

[56] References Cited

U.S. PATENT DOCUMENTS

| | | | |
|---|---|---|---|
| 3,732,968 | 5/1973 | Fedor et al. | 198/395 |
| 3,951,189 | 4/1976 | Cromeens | 144/91 |
| 4,435,837 | 3/1984 | Abernathy | 198/395 |
| 4,441,537 | 4/1984 | Vartiainen | 83/367 |
| 4,484,607 | 11/1984 | Gemmani | 144/2 R |

Primary Examiner—W. Donald Bray

[57] ABSTRACT

The method of the present invention comprises scanning a piece of lumber proximate its end to determine which side of its longitudinal center line its fibers are oriented toward. The piece of lumber then is oriented such that the tangent of the cutting circle of a rotary cutter, which is used to machine finger joints in its end, is offset from the fiber direction by at least 90°. Finger joints then are machined in the end of the piece of lumber by the cutter. The apparatus includes a conveyor which transports a plurality of pieces of lumber normal to their longitudinal axes. A scanner, which determines the fiber direction of each piece of lumber, transmits this information along with the location of the piece of lumber on the conveyor to a microprocessor. An orienter then is annunciated by the microprocessor to rotate those pieces of lumber having fiber direction which is oriented improperly before they are fed through a finger jointer.

5 Claims, 1 Drawing Sheet

U.S. Patent
Jan. 31, 1989
4,800,938
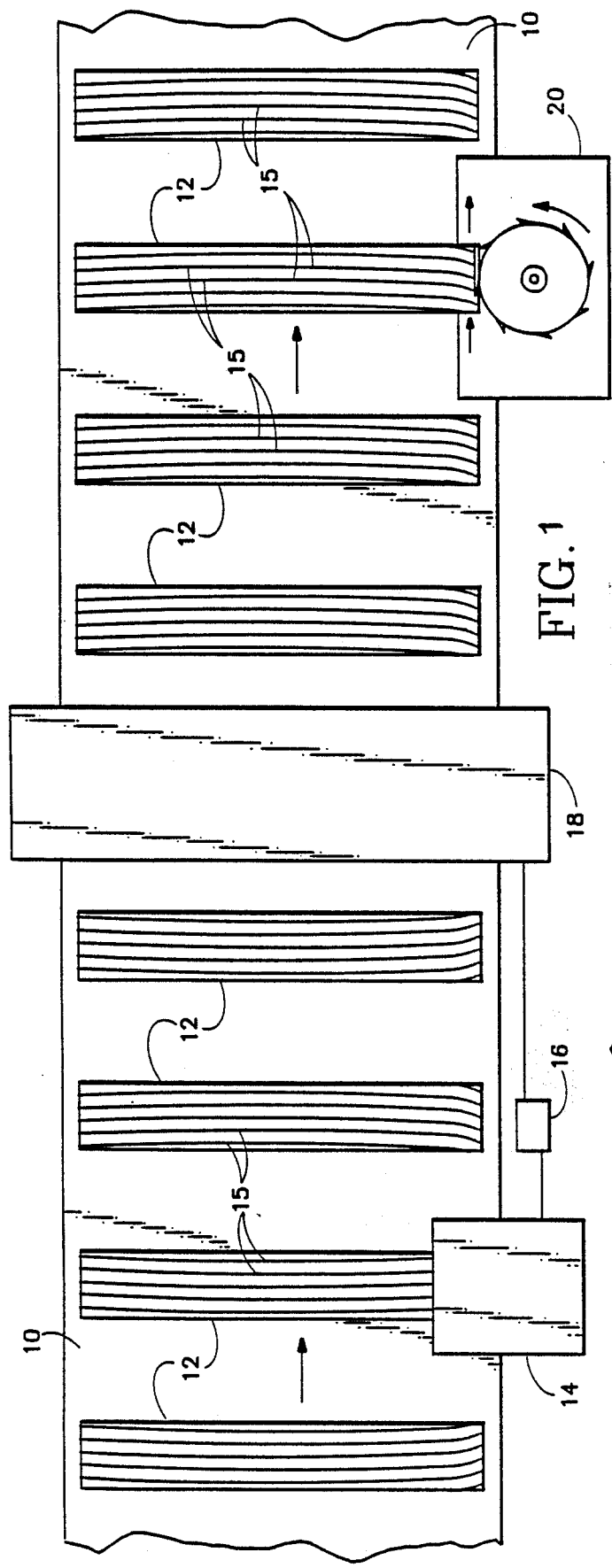
FIG. 1
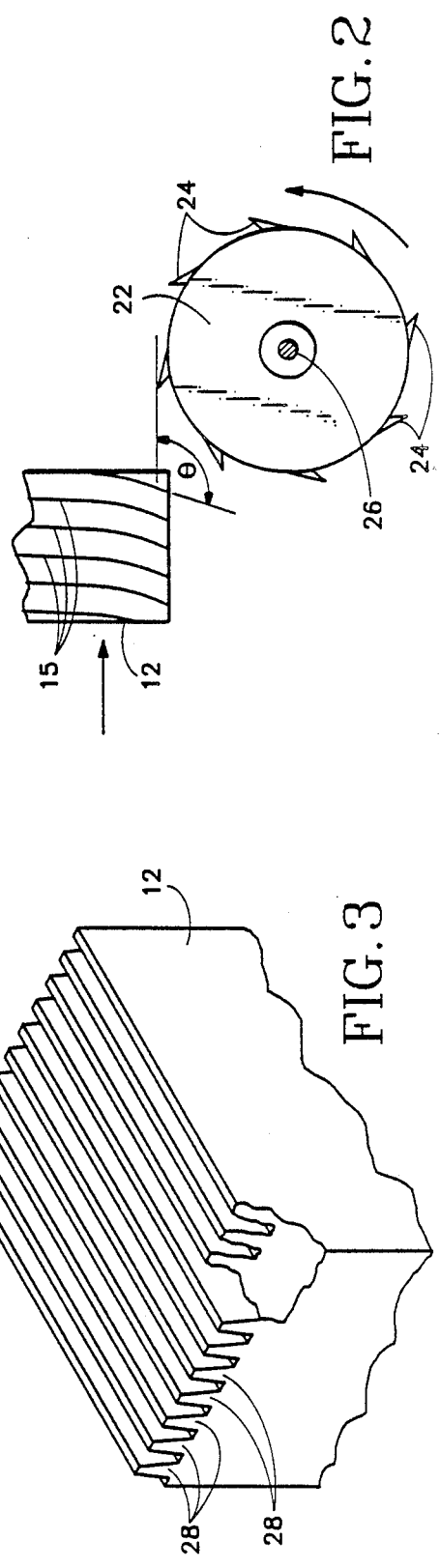
FIG. 2
FIG. 3

METHOD AND APPARATUS FOR FINGER JOINTING LUMBER

BACKGROUND AND SUMMARY OF THE INVENTION

This invention relates to a method and apparatus for maximizing the amount of lumber which can be used and still prevent chipout when finger joints are machined in the ends of pieces of lumber.

There are many applications where long continuous pieces of clear lumber are required, such as for molding and the like. These long pieces are obtained by finger jointing the ends of shorter pieces and gluing them together, since this process does not cause serious disfiguration on the face of the joined piece. Many of the shorter pieces used for this purpose are obtained by cutting knots or other imperfections out of longer pieces. When this occurs, determining how close to the imperfection the cut should be made is not easily ascertained. If the cut is made too close to the imperfection, local wood fiber deviation will be encountered and the corner of some of the raised portions between finger joint notches will break off, an occurrence which commonly is referred to as chipout. On the other hand, if the cut is spaced away from the knot usable lumber is wasted.

Growth ring patterns and fiber orientation are two separate and independent characteristics. Growth ring patterns, however, often can indicate areas of local fiber deviation. The term cross-grain is used to mean fibers that are not oriented parallel to the major axis of a piece of lumber. Because wood fibers are not individually visible to the naked eye, heretofore the decision where to make the cut has been determined by the person making it based on the visible growth ring pattern proximate a defect including a respectable margin for error. This method is clearly inefficient and does not permit the cut to be made as close to the imperfection as possible. Accordingly, a visual determination of where the cut will be made relative to an imperfection is very subjective, and, as a result, generally wasteful of lumber. Second, even where the visual growth ring pattern does reflect the fiber direction, it has been the prior art practice to place the cut in a location where the fiber direction is substantially parallel with the longitudinal axis of the piece of lumber and, as it happens, this practice causes a considerable amount of lumber to be wasted.

The present invention overcomes the shortcomings of the prior art method for determining where to make the cut when imperfections are being removed from pieces of lumber which are to have finger joints cut in their ends by making the cut immediately adjacent to the imperfection, and then orienting the piece of lumber prior to machining in a manner that will eliminate chipout regardless of the degree of cross-grain present. This requires that after the cut has been made the end of the board is scanned by a device which can detect the direction in which the fibers are oriented with respect to the longitudinal center line of the piece of lumber. The piece of lumber then is oriented prior to machining such that the angle between the tangent of the cutting circle of the finger joint cutter and the fiber direction is greater than or equal to 90°.

The apparatus for accomplishing this comprises a conveyor which transports the cut pieces of lumber normal to their longitudinal axes. A commercially available scanner, which is positioned above and below one end of the pieces of lumber, determines the direction of the fibers in each piece of lumber as it passes below the scanner and transmits this information along with the location of the piece of lumber on the conveyor to a microprocessor for storage.

Located downstream of the scanner is an orienter which is capable of rotating the pieces of lumber 180° about their longitudinal axes upon command. The orienter is annunciated by the microprocessor to rotate each piece of lumber having its fibers angled to one side of its longitudinal axis and not to rotate any piece of lumber having its fibers angled to the other side of its longitudinal axis or parallel with it.

The final element of the apparatus of the present invention is a finger jointer which comprises a high speed rotating cylinder having a plurality of knives projecting from its periphery. The finger jointer is located downstream of the orienter and is positioned such that the knives cut into the ends of the pieces of lumber as the conveyor transports them past the cutters.

The pieces of lumber are positioned by the orienter such that the fiber direction at the ends which are to be machined are angled away from the finger jointer. Thus, the tangent of the cutting circle of the knives as they enter the pieces of lumber and the fiber direction always are offset from one another by 90° or more.

Accordingly, it is a principal object of the present invention to provide a method for machining finger joints as close as possible to an imperfection which is located in a piece of lumber without the occurrence of chipout.

It is a further object of the present invention to provide such a method which permits machining of the finger joints in lumber having cross-grain.

It is a further object of the present invention to provide such a method in which the pieces of lumber are oriented such that the direction in which the knives of the finger joint cutter are moving is aligned as close to the fiber direction as possible when the finger joints are being machined.

It is a further object of the present invention to provide an apparatus for performing the foregoing method.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a schematic plan view of an apparatus embodying the features of the present invention.

FIG. 2 is a detailed view, at an enlarged scale, of a portion of the apparatus of FIG. 1.

FIG. 3 is a fragmentary pictorial view of a piece of lumber having finger joints of the type made by the present invention located in it.

PREFERRED EMBODIMENT OF THE INVENTION

Referring to FIG. 1 of the drawings, the apparatus of the present invention includes a conveyor, such as an endless chain 10, which is sized to carry a plurality of pieces of lumber 12 with their elongate axes being oriented at right angles with respect to the direction the chain travels.

Positioned proximate the chain 10 is a scanner 14 which determines the direction the fiber is oriented on both sides of pieces of lumber which are scanned by it. This direction is indicated on the drawings by fiber lines 15. Such scanners are known in the prior art and are used to find instances where the localized grain slope exceeds a predetermined value in a board and thereby causes an unacceptable reduction in strength. Such a device is described in *Fourth Nondestructive Testing of Wood Symposium* published by Engineering Extension Services of Washington State University in 1978 and is commercially available from Metriguard, Inc. of Pullman, Wash. The scanner scans only one of the ends of the pieces of lumber and determines whether the fiber direction near that end is parallel with the longitudinal axes or is skewed toward the right or left. This information is relayed to a microprocessor 16 which stores the information along with the positions of the pieces of lumber on the chain 10.

Downstream of the scanner 14, is an orienter 18 which is capable of rotating the pieces of lumber 12 180° about their longitudinal axes upon command. Lumber handling devices of this type are well known in the prior art. The orienter is annunciated by the microprocessor 16 to orient each piece of lumber so that the fiber direction at its end either is parallel with its longitudinal axis or angles off toward the left, as viewed in FIG. 1.

Located downstream of the orienter 18 is a finger jointer 20. The finger jointer comprises a cylindrical cutting wheel 22, shown schematically in FIG. 2, having a plurality of cutting knives 24 positioned around its periphery. The axis 26 of the cutting wheel is oriented vertically so that the knives cut grooves 28, FIG. 3, in the ends of the pieces of lumber as they pass through the finger jointer. As can be seen in FIG. 2, the wheel rotates such that the knives move toward the pieces of lumber as they are fed past the cutter on the chain 10. Thus, the tangent of the cutting circle of the knives 24 as they enter the pieces of lumber are always oriented at an angle $\theta$ with respect to the fiber lines 15 which is greater than or equal to 90°. Furthermore, as the knives leave the pieces of lumber, the location where chipout occurs, the knives are more nearly aligned with the fiber direction than would be the case if some of the pieces of lumber had been rotated 180°.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Method for machining finger jointing grooves in the end of an elongate piece of lumber with a rotary cutter having a plurality of knives located on its periphery, said method comprising:
    (a) scanning the piece of lumber in a plane which is parallel with the plane the grooves are to be machined in to determine mine the fiber direction in said plane proximate the end which is to be machined;
    (b) positioning said piece of lumber relative to the rotary cutter such that the angle between the tangent of the cutting circle of the knives as they enter the piece of lumber and said fiber direction is greater than or equal to 90°; and
    (c) thereafter machining finger jointing grooves with the rotary cutter.

2. Method for machining finger jointing grooves in the end of an elongate piece of lumber with a rotary cutter having a plurality of knives located on its periphery, said method comprising:
    (a) scanning the piece of a lumber in a plane which is parallel with the plane the grooves are to be machined in;
    (b) positioning said piece of lumber relative to the rotary cutter such that the tangent of the cutting circle of the knives as they leave the piece of lumber will be most closely aligned with said fiber direction; and
    (c) thereafter machining finger jointing grooves with the rotary cutter.

3. A method for cutting knots out of a piece of lumber and joining the cut pieces together to form a knot-free piece of lumber, said method comprising:
    (a) sawing the piece of lumber perpendicular to its longitudinal axis on both sides of the knot at a location immediately adjacent to the knot to obtain two cut pieces of lumber;
    (b) scanning the cut edges of said cut pieces of lumber to determine the fiber direction therein;
    (c) positioning said cut pieces of lumber relative to a rotary cutter such that the angle between the tangent of the cutting circle of the knives on said rotary cutter as they enter said cut pieces of lumber and said fiber direction is greater than or equal to 90°;
    (d) thereafter machining finger jointing grooves in the cut edges of said cut pieces of lumber with the rotary cutter.

4. Apparatus for finger jointing grooves in the end of an elongate piece of lumber with a rotary cutter having a plurality of knives located on its periphery, said apparatus comprising:
    (a) scanner means for locating the fiber direction in the end of the piece of lumber which is to be machined, in a plane which is parallel with the plane the grooves are to be machined in;
    (b) orienter means for positioning said piece of lumber relative to the rotary cutter such that the angle between the tangent of the cutting circle of the knives as they enter the piece of lumber and said fiber direction is greater than or equal to 90°; and
    (c) a finger jointer which is positioned to machine finger joints in the end of said piece of lumber after it has been scanned and positioned.

5. The apparatus of claim 4 including conveyor means for moving a plurality of pieces of lumber sequentially past said scanner means, said orienter means and said finger jointer.

* * * * *

UNITED STATES PATENT AND TRADEMARK OFFICE
CERTIFICATE OF CORRECTION

PATENT NO. : 4,800,938

DATED : January 31, 1989

INVENTOR(S) : Malcolm M. Coombs

It is certified that error appears in the above-identified patent and that said Letters Patent is hereby corrected as shown below:

Col. 3, line 62     After "determine" delete --mine--

Signed and Sealed this

Fifth Day of June, 1990

Attest:

HARRY F. MANBECK, JR.

*Attesting Officer*     *Commissioner of Patents and Trademarks*